US006614387B1

(12) United States Patent
Deadman

(10) Patent No.: US 6,614,387 B1
(45) Date of Patent: Sep. 2, 2003

(54) PROXIMITY MEASURING APPARATUS

(75) Inventor: Harry A Deadman, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/763,326

(22) PCT Filed: Sep. 8, 1999

(86) PCT No.: PCT/GB99/02987

§ 371 (c)(1),
(2), (4) Date: Feb. 21, 2001

(87) PCT Pub. No.: WO00/19237

PCT Pub. Date: Apr. 6, 2000

(30) Foreign Application Priority Data

Sep. 29, 1998 (GB) ............................................. 9821021

(51) Int. Cl.$^7$ ........................... G01S 13/08; G01S 13/93

(52) U.S. Cl. ............................. 342/70; 342/71; 342/72; 342/42; 342/125; 342/145; 340/903; 340/435

(58) Field of Search ............................. 342/70, 71, 72, 342/42, 44, 46, 47, 51, 118, 125, 131, 132, 134, 135, 145, 189, 195; 340/435, 436, 903; 701/301

(56) References Cited

U.S. PATENT DOCUMENTS

| | | | | |
|---|---|---|---|---|
| 3,801,982 A | * | 4/1974 | Richmond | 342/110 |
| 4,078,234 A | * | 3/1978 | Fishbein et al. | 342/110 |
| 4,757,315 A | * | 7/1988 | Lichtenberg et al. | 342/125 |
| 5,387,916 A | | 2/1995 | Cohn | 342/44 |
| 5,559,829 A | | 9/1996 | Le Strat et al. | 375/206 |
| 5,684,490 A | * | 11/1997 | Young et al. | 342/70 |
| 5,724,041 A | * | 3/1998 | Inoue et al. | 342/70 |
| 5,923,280 A | * | 7/1999 | Farmer | 342/70 |
| 6,052,068 A | * | 4/2000 | Price et al. | 340/933 |
| 6,218,982 B1 | * | 4/2001 | Shirai et al. | 342/118 |

FOREIGN PATENT DOCUMENTS

| | | |
|---|---|---|
| EP | 0 822 679 | 2/1998 |
| GB | 2 322 752 | 9/1998 |
| WO | WO98/27441 | 6/1998 |

OTHER PUBLICATIONS

"Cradar–an open–loop extended–monopulse automotive radar", Grimes, D.M.; Grimes, C. A.; Vehicular Technology, IEEE Transactions on, vol.: 38 Issue: 3, Aug. 1989, pp.: 123–131.*
Hamant B et al.: "A Novel Direct Sequence Spread Spectrum Automatic Vehicle Identification System", IEEE Vehicular Technology Conference, US, New York, IEEE, vol. CONF. 46, pp. 1863–1867.
Mo–Han Fong et al.: "Concatenated Orthogonal/PN Codes for DS–CDMA Systems in a Multi–User and Multipath Fading Environment", Proceedings of the Gloval Telecommunications Conference (GLOBECOM), US, New York, IEEE, pp. 1642–1646.

* cited by examiner

Primary Examiner—John B. Sotomayor
(74) Attorney, Agent, or Firm—Nixon & Vanderhye P.C.

(57) ABSTRACT

A proximity measuring apparatus (70) comprises an interrogator (80) for generating an interrogation signal encoded with a reference signature code comprising concatenated codes and emitting it as interrogating radiation. It also incorporates a transponder (90) for receiving the interrogating radiation, demodulating it to extract its signature code and then remodulating it after a delay period to provide a signal for reemission as return radiation therefrom. The interrogator (80) receives return radiation at its antenna (260) and demodulates it to extract its signature code and then correlates the code with the reference code to determine mutual correlation thereof. The interrogator (80) incorporates a computer (290) for controlling a scan direction of the antenna (260) and for measuring time delay between emission of the interrogating radiation therefrom and receipt of corresponding return radiation. The computer (290) computes distance and relative bearing of a transponder (90) providing the return radiation from the scan direction and the time delay. The apparatus (70) may be used for improving road vehicle safety.

18 Claims, 8 Drawing Sheets

PROXIMITY MEASURING APPARATUS

BACKGROUND OF THE INVENTION

1. Field of the Invention

The present invention relates to a proximity measuring apparatus, and more particularly but not exclusively to an apparatus for incorporation into road vehicles for measuring their mutual proximity.

2. Discussion of Prior Art

Proximity measuring apparatus are well known. They are incorporated, for example, into vehicles for providing information regarding their positions relative to one another.

One example of a proximity measuring apparatus is a road vehicle Doppler radar system. In use, the system is mounted onto a road vehicle and emits interrogating radiation towards other road vehicles which reflect the radiation as echo radiation back to the system for analysis therein to determine collision risk of the other vehicles to the system. A proximity measuring apparatus implemented as a microwave Doppler radar anticollision system is described in a United Kingdom patent application GB 96 02250.4.

A number of problems are encountered with the system described in the patent application GB 96 02250.4, namely:

(i) information available within other vehicles reflecting the interrogating radiation emitted from the system is not communicated back to the system; such information is potentially of benefit for more accurately determining whether or not the other vehicles represent a genuine collision hazard to the system, for example a vehicle in front is decelerating or its engine has stalled;

(ii) when a plurality of vehicles each incorporate the system, there is a risk of interference between several the vehicles when operating simultaneously within range of one another; and (iii) spurious multipath reflections from roadside stationary objects give rise to complex and potentially misleading echo radiation to the system.

The system described in GB 96 022509 attempts to alleviate the problem in (ii) above by making frequency of emitted radiation dependent upon orientation of the system, the orientation being determined relative to the earth's magnetic poles using a mechanical or electronic compass. However, this is potentially unreliable, especially when there are numerous vehicles each incorporating and using the system within range of one another. For example, a problem arises when a series of vehicles each incorporating the system travel in convoy in an identical direction; because the systems installed in the vehicles are orientated in an identical bearing, their systems operate at identical frequencies such that mutual interaction of the systems can occur giving rise to a risk of erroneous proximity measurement. Moreover, on account of the number of vehicles presently in use in the world, it is not feasible to allocate a unique radiation frequency band for each vehicle; problems of interference and interaction between systems in the prior art cannot therefore be ameliorated.

It is well known that radiation emitted from a source can be modulated with a signature code corresponding to the source; this allows the source to be identified when the radiation is subsequently received by demodulating it to extract its signature code. Such radiation modulation is frequently employed in radar and communication systems, for example in mobile telephones where each telephone is identified by a corresponding unique apparatus number.

A problem arises in a scenario where;

(i) there are numerous mobile sources of radiation within radiation receiving range of one another; and (ii) the sources are constrained to operate at identical frequencies on account of limited available allocated electromagnetic radiation spectrum.

In the scenario, each source must have associated with it a corresponding unique signature code for it to be uniquely identifiable. When there are several million sources, relatively longer signature codes are required for distinguishing the numerous sources from one another. There arises then a further problem that transmission time to transmit the relatively longer codes affects rapidity with which sources can communicate information to one another; this is particularly relevant when signature code transmission occupies a relatively larger proportion of total radiation transmission time.

When the scenario relates to proximity measurement apparatus installed into road vehicles, each road vehicle requires a unique corresponding signature code for its apparatus because any combination of road vehicles in close mutual proximity can potentially occur in practice. There are presently many million road vehicles in use on roads in the world, hence many million unique signature codes are required to reduce a risk of potential confusion between signature codes and associated collision risk.

Multipath reflection from stationary objects in a road environment gives rise to a further problem when proximity measurement apparatus are used. Such multipath reflection can result in corruption of transmitted signature codes resulting in erroneous detection of a potentially dangerous collision event. It is therefore necessary for such systems to employ signature codes which are robust to corruption from multipath reflection and other sources of interfering radiation.

Signature codes are conventionally made- more robust by incorporating error correction data within them, for example parity bits, or by making the codes relatively longer by incorporating redundancy into the code. This results in a problem that their transmission duration is increased which limits code transmission repetition rate; this results in less frequent updating of proximity measurement for use in collision risk assessment, thereby increasing risk of collision.

There are therefore conflicting constraints of providing a large number of unique signature codes which each have a relatively short length and yet are robust to corruption arising from, for example, multipath interference. This represents a problem which the invention seeks to address.

SUMMARY OF THE INVENTION

It is an object of the invention to provide a proximity detecting apparatus which alleviates at least one of the problems mentioned above and provides, for example,. more reliable collision warning.

According to the present invention, a proximity measuring apparatus is provided incorporating:

(a) transponding means for receiving interrogating radiation and emitting return radiation in response thereto; and (b) interrogating means for generating and emitting the interrogating radiation and for receiving the return radiation for determining proximity of the interrogating means relative to the transponding means, characterised in that (c) the interrogating means is adapted to encode the interrogating radiation with a signature code comprising a plurality of concatenated data sequences;

(d) the transponding means is adapted to receive the interrogating radiation, and to encode the return radiation with the signature code, thereby enabling the interrogating means to associate the interrogating radiation with the return radiation.

The invention provides the advantage that the signature code is relatively short and that a relatively large number of unique signature code combinations with desirable correlation characteristics is possible.

The transponding means of a first vehicle may discriminate between its interrogating radiation and return radiation emitted in response thereto from interrogating radiation and corresponding return radiation of other vehicles incorporating the apparatus on the basis of signature code used. This advantage arises because each apparatus employs a signature code in its interrogating radiation and its corresponding return radiation which is unique to itself.

The apparatus is mountable, for example, into road vehicles, one apparatus for each vehicle. This enables the apparatus in a first vehicle to identify when it is likely to collide with other vehicles and provide warning to a driver of the first vehicle that corrective action is needed to avoid a collision.

For explaining the invention, a pseudo-random sequence of data bits is defined as a sequence of data bits whose values vary in a random pattern but which eventually repeats itself. A truly random sequence of data bits is defined as a sequence of data bits whose values vary in a random pattern which never repeats itself. A maximum length pseudo-random sequence of data is defined as a maximum length of a pseudo-random sequence that can be formed before the sequence is repeated.

The concatenated data sequences may incorporate concatenated pseudo-random data sequences. This provides a robust signature code which is relatively insensitive to corruption arising from Doppler frequency shift resulting from movement of the apparatus relative to one another. Pseudo-random codes also exhibit useful correlation properties.

The concatenated data sequences may incorporate concatenated Gold code data sequences. This provides an advantage of providing more unique signature codes compared to signature codes of comparable length incorporating concatenated pseudo-random sequences.

The interrogating means may incorporate correlating means for correlating the signature code encoded into the interrogating radiation with a signature code encoded into the return radiation received thereat, thereby enabling it to associate the interrogating radiation with its corresponding return radiation. This provides an advantage that the interrogating means is capable of recognising thereby return radiation emitted in response to receipt of its interrogating radiation.

The transponding means may be adapted to emit the return radiation at a frequency which is substantially different to that of the interrogating radiation received thereat, thereby enabling the interrogating means to discriminate between passive reflections of the interrogating radiation and the return radiation. This enables the interrogating means to discriminate between spurious multipath reflections, for example reflections of the interrogating radiation from lamp posts and roadside buildings, and the return radiation from a transponder.

The transponding means may be arranged to emit the return signal as the return radiation after a time delay period from receipt of the interrogating radiation, said time delay period being greater than a time required for the interrogating radiation to propagate from the interrogating means to be passively reflected and re-received thereat at greater than a threshold intensity, and the interrogating means may be adapted to discriminate between reception of delayed and un-delayed return radiation. This provides the advantage that the interrogating means is responsive only to other vehicles incorporating the transponding means and is not confused by spurious multipath passive reflections of said interrogating radiation.

The interrogating means may incorporate:
(i) an antenna for emitting the interrogating radiation and receiving the return radiation, said antenna having a directional gain response comprising a direction of enhanced gain relative thereto;
(ii) scanning means for angularly scanning said antenna; and
(iii) computing means for controlling the scanning means and determining direction of the transponding means relative to the interrogating means from scan direction of said antenna in which the return radiation is received.

Moreover, the interrogating means may incorporate computing means for determining a distance of the transponding means relative thereto, said computing means adapted to record an interval of time between emission of the interrogating radiation from said interrogating means and receipt of corresponding return radiation thereat, said computing means adapted to calculate said distance using said interval of time. This provides the advantage that the computing means is thereby capable of tracking trajectory of transponding means providing the return radiation relative to the interrogating means.

The apparatus may incorporate warning means in communication with the computing means, said computing means adapted to monitor position of the transponding means relative thereto, and to activate said warning means to provide a warning alarm when there is a risk of collision of said transponding means with said interrogating means. This provides an advantage of a user of the apparatus to take corrective action in response to the warning alarm to avoid impact or collision.

The computing means may be adapted to monitor position of the transponding means relative to the interrogating means and activate braking means to modify a trajectory of said interrogating means for collision avoidance when there is a risk of collision of said transponding means with said interrogating means.

The interrogating means may be adapted to vary its time interval duration between successive emissions of interrogating radiation therefrom. This provides an advantage of reducing the risk of two interrogating means simultaneously repetitively attempting to interrogate transponding means and thereby failing to detect its presence. This provides the advantage that if synchronous interrogation of the transponding means occurs, subsequent interrogation is likely to be dephased.

The interrogating means may be arranged to vary the time intervals in multiples of a time step, said multiples altering pseudo-randomly. This provides the advantage that two or more interrogator means simultaneously emitting interrogating radiation are likely to become more rapidly dephased.

The transponding means may incorporate sensing means for sensing at least one of acceleration, speed and orientation of said transponding means, for providing data thereto, and the transponding means may be adapted to encode said data onto the return radiation. This provides the advantage that the data is available to the interrogating means receiving the return radiation for determining with more certainty mutual collision risk.

The interrogating means may be mounted in a frontal region of a vehicle and the transponding means may be mounted in a rear region thereof. This provides a practical arrangement for the apparatus because a frontal collision of the vehicle onto a rear region of another vehicle is a most probable type of collision in practice.

For elongate vehicles, side collisions may occur. The apparatus may be incorporated into the elongate vehicle, the interrogating means in a frontal region of the vehicle and said transponding means in a rear region and side regions thereof. Incorporation of the transponding means in the side regions of the elongate vehicle provides an advantage of reduced risk of collision, especially side impact collision.

In another aspect, the invention provides a method of measuring proximity in a proximity measuring apparatus, the apparatus including an interrogator and a transponder, the method comprising the steps of:

(a) generating and emitting interrogating radiation from the interrogator, said radiation incorporating a signature code comprising a plurality of concatenated data sequences;

(b) receiving the interrogating radiation at the transponder and generating a receive signal in response thereto;

(c) storing the receive signal;

(d) generating a return signal in response to the receive signal, said return signal encoded with the signature code;

(e) emitting the return signal after a time delay period from receipt of the interrogating radiation;

(f) receiving the return radiation at the interrogator;

(g) correlating the signature code encoded into the interrogating radiation with the signature code encoded into the return radiation for associating the return radiation with the interrogating radiation; and (h) calculating at the interrogator proximity of the transponder relative thereto from propagation direction of the return radiation relative to the interrogator and time interval between emission of the interrogating radiation and receipt of the return radiation.

In the method, the concatenated data sequences may incorporate concatenated pseudo-random data sequences. Alternatively, the concatenated data sequences incorporate concatenated Gold code data sequences.

BRIEF DESCRIPTION OF THE DRAWINGS

In order that the invention might be more fully understood, embodiments thereof will now be described, by way of example only, with reference to the accompanying drawings in which.

DETAILED DISCUSSION OF EMBODIMENTS

Figure 1:
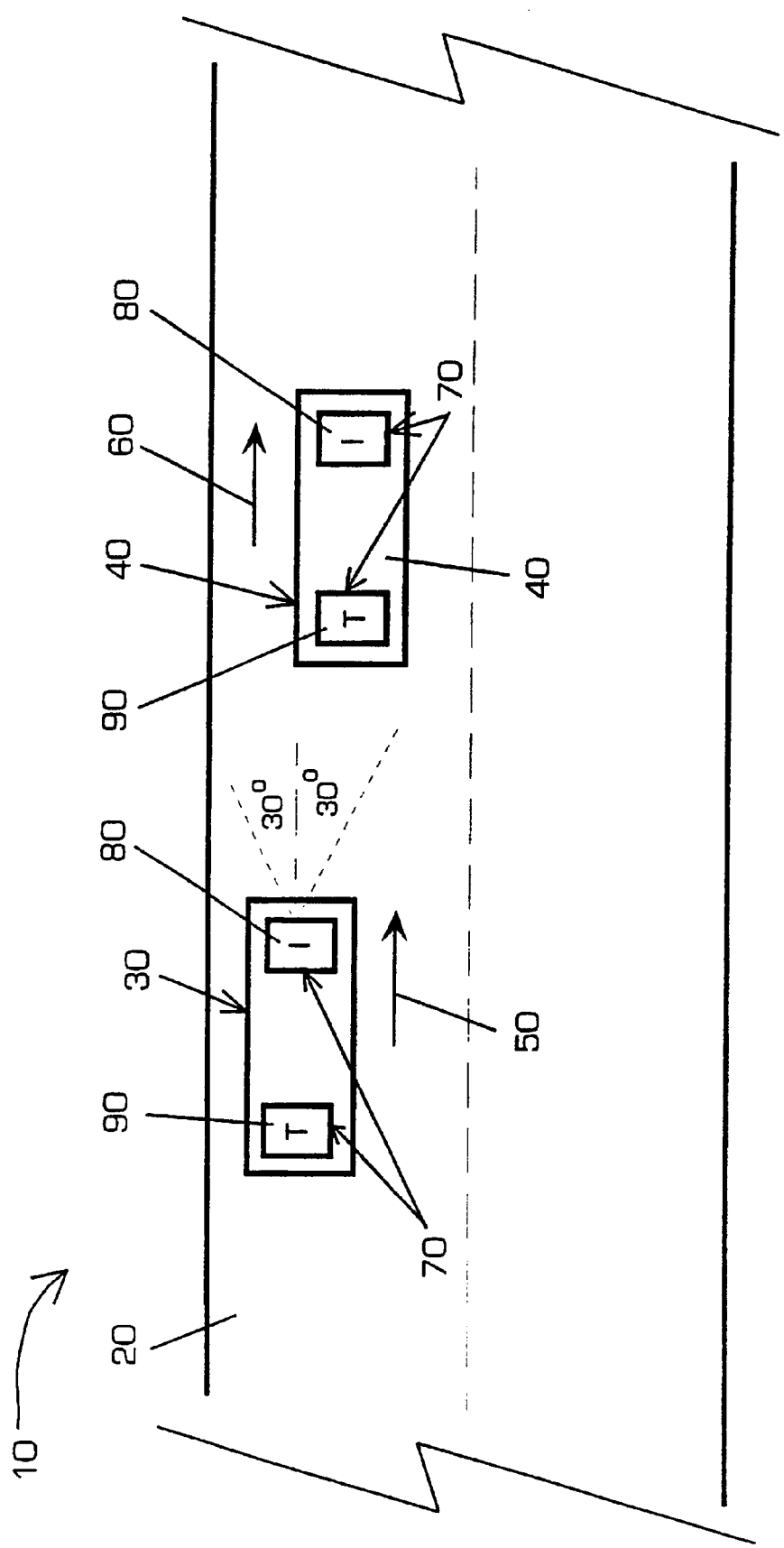
FIG. 1 illustrates a section of road with two vehicles travelling therealong, each of said vehicles incorporating a proximity detecting apparatus of the invention.

Referring to FIG. 1, there is shown a section of road indicated generally by 10. The section 10 includes a carriageway 20. A first vehicle 30 and a second vehicle 40 are illustrated travelling along the carriageway 20 in directions indicated by arrows 50, 60 respectively. The first vehicle 30 is shown travelling a short distance of 10 m behind the second vehicle 40. Each vehicle 30, 40 incorporates a proximity measuring apparatus of the invention indicated generally by 70. Each apparatus 70 comprises a radar interrogator (I) 80 and a transponder (T) 90. Each interrogator 80 and each transponder 90 is mounted in a frontal region and a rear region respectively of its associated vehicle 30, 40.

The interrogator 80 incorporates an antenna (not shown in FIG. 1) which has an aperture of 100 mm diameter. The antenna provides a directional polar gain response comprising a direction of enhanced gain; this direction will be referred to as its mainbeam direction. The antenna is arranged to emit in its mainbeam direction a beam of continuous wave (CW) phase encoded microwave radiation having a frequency of 77 GHz. The beam has an angular beamwidth of 2.7° as defined by polar angles at which the beam's energy density is −3 dB relative its energy density at a central region of the beam. This beamwidth of 2.7° corresponds to an equivalent beamwidth for radiation emission and corresponding reception of the radiation at the antenna of 1.9°. The beam comprises sufficient energy to be detectable by the transponder 90 at a distance in a range of 5 m to 150 m. The beam is scanned continuously at 240°/sec through an angular range of −30° to +30° relative to the direction indicated by the arrows 50, 60. In other words, the beam is scanned continuously at a rate of 4 Hz which is suitably frequent for providing data for a sequence of computing functions which are performed in the interrogator 80; the sequence will be described in more detail later. The beam has a dwell time of 7.9 ms in a specific direction within the angular range during which the interrogator 80 emits radiation and receives a response from a transponder 90 located in the specific direction; this dwell time is determined by a ratio of the beamwidth 1.9° and the beam scanning rate of 240°/sec. The transponder 90 incorporates a radiation receiver unit for receiving radiation having a frequency of 77 GHz and a retransmitter unit for emitting radiation at the same frequency.

Operation of the apparatus 70 in the section of road 10 will now be described with reference to FIG. 1. The interrogator 80 of the first vehicle 30 scans the carriageway 20 ahead of it by emitting and scanning its beam of interrogating radiation towards it, the beam being encoded with a reference signature code. The signature code will be explained in more detail later. The beam of radiation is received by the transponder 90 of the second vehicle 40 which responds after a delay of fixed duration by emitting return radiation incorporating the signature code. The interrogator 80 of the first vehicle 30 receives the return radiation and uses it to compute its position relative to the transponder 90 and whether or not the second vehicle 40 represents a collision hazard. If there is a risk of collision, this interrogator 80 provides a warning signal to its driver and, when the situation is particularly dangerous, automatically applies the vehicle's brakes.

In a similar manner, the transponder 90 of the first vehicle 30 is arranged to be responsive to an interrogator 80 in a vehicle trailing behind it, and the interrogator 80 of the second vehicle 40 is arranged to interrogate a transponder 90 of a vehicle leading in front of it.

Figure 2:
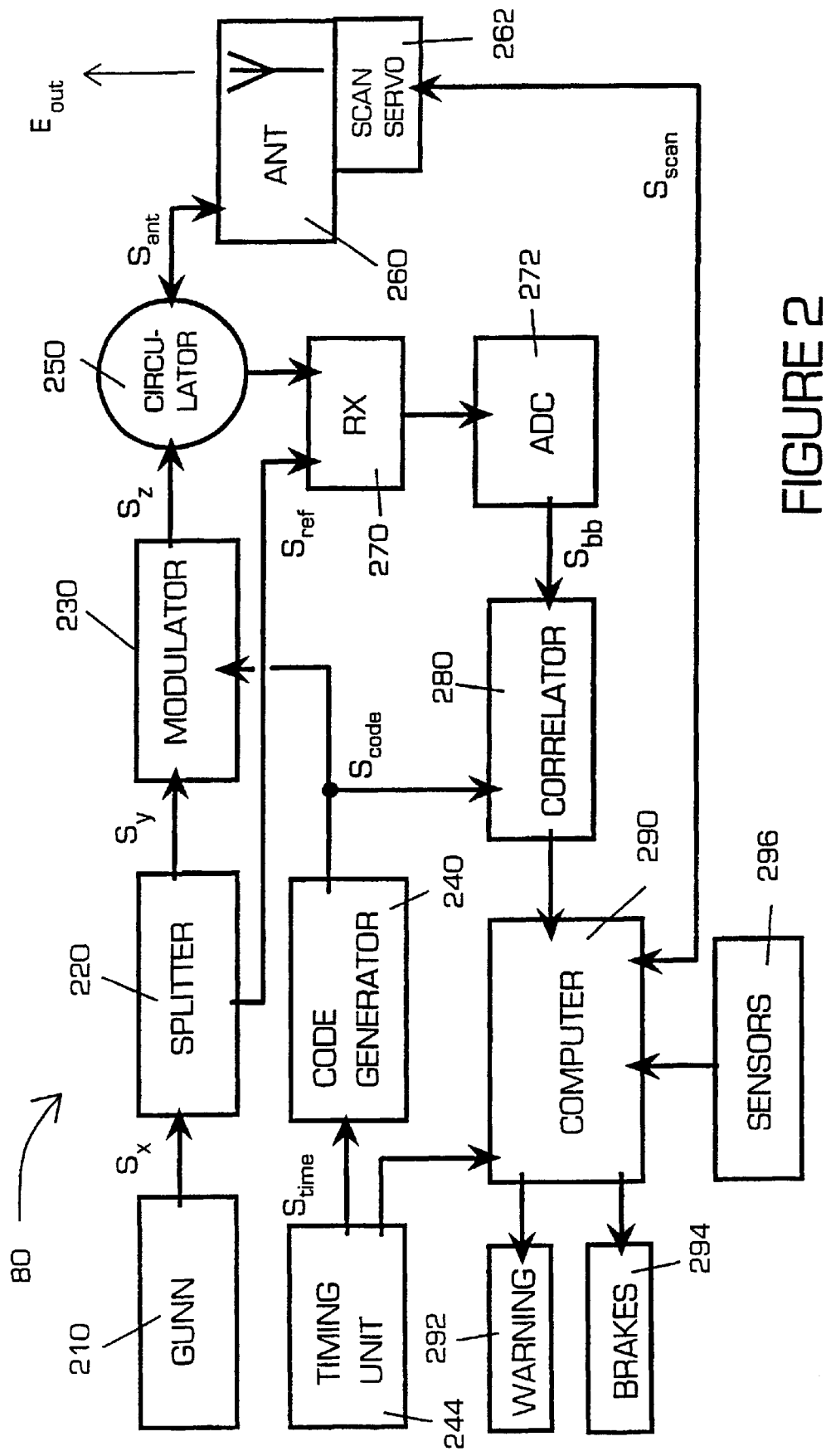
FIG. 2 illustrates schematically an interrogator incorporated into the apparatus shown in FIG. 1.

Referring now to FIG. 2, there is shown a schematic illustration of the interrogator 80 shown in FIG. 1. The interrogator 80 comprises a Gunn diode master oscillator unit (GUNN) 210, a signal splitter unit (SPLITTER) 220, a bi-state phase modulator unit (MODULATOR) 230, a code generator unit (CODE GENERATOR) 240, a master timing unit (TIMING UNIT) 244, a circulator unit (CIRCULATOR) 250, an antenna (ANT) 260 with its associated scanning servo mechanism (SCAN SERVO) 262, a receiver unit (270), an analogue-to-digital converter unit (ADC) 272, a correlator unit (CORRELATOR) 280, a computer (COMPUTER) 290, a warning unit (WARNING) 292, a brake servo unit (BRAKES) 294 and a sensor unit (SENSORS) 296. The unit 296 incorporates a number of accelerometers, an electronic compass and a vehicle wheel turning rate sensor indicative of speed of a vehicle onto which the interrogator 80 is mounted.

Interconnection of the units 210 to 250, 270 to 280, 292 to 296, the computer 290, the antenna 260 and the mechanism 262 will now be described. The oscillator unit 210 includes an $S_x$ signal output which is connected to an input of the splitter unit 220. The splitter unit 220 incorporates a signal $S_y$ output and a signal $S_{ref}$ output. The $S_y$ output is connected to a carder signal input of the modulator unit 230 and the $S_{ref}$ output is connected to a local oscillator input of the receiver unit 270. The timing unit 244 incorporates two outputs $S_{time}$ which are connected to timing inputs of the generator unit 240 and of the computer 290. The generator unit 240 includes a signal $S_{code}$ output which is connected to a modulation input of the modulator unit 230, and to a first reference input of the correlator unit 280. The modulator unit 230 incorporates a signal $S_z$ output which is connected to an input of the circulator unit 250. The circulator unit 250 includes a signal $S_{ant}$ port which is connected to a signal port of the antenna 260. The circulator unit 250 incorporates a signal output which is connected to a signal input of the receiver unit 270. The receiver unit 270 incorporates a modulated signal output which is connected to an input of the converter unit 272. A digital $S_{bb}$ output of the converter unit 272 is connected to a second input of the correlator unit 280. The correlator unit 280 includes an output which is connected to a data input of the computer 290. The computer 290 incorporates two signal outputs and a bi-directional $S_{scan}$ signal port; the signal outputs are connected to the warning unit 292 and the brake servo unit 294, and the $S_{scan}$ port is connected to the servo mechanism 262. The computer 290 includes a sensor input connected to the sensor unit 296 for receiving sensor data.

Operation of the interrogator 80 will now be described. The oscillator unit 210 generates a continuous wave 77 GHz signal $S_x$ and outputs it to the splitter unit 220 which divides it into a reference signal $S_{ref}$ and an output signal $S_y$. The signal $S_{ref}$ is a local oscillator signal for the receiver unit 270. The oscillator unit 210 and the splitter unit 220 are components which are known in the art. The modulator unit 230 receives the signal $S_y$ from the splitter unit 220 together with an encoding signal $S_{code}$ from the generator unit 240. The encoding signal $S_{code}$ is generated and output by the generator 240 after receiving a timing prompt signal $S_{time}$ from the timing unit 244. The signal $S_{code}$ comprises the reference signature code as mentioned above. The modulator unit 230 phase modulates the signal $S_y$ in response to the signal $S_{code}$ to provide an encoded output signal $S_z$. The circulator unit 250 receives the signal $S_z$ and impedance matches it to provide an antenna signal $S_{ant}$ for the antenna 260. The antenna 260 receives the antenna signal $S_{ant}$ and emits it as microwave interrogating radiation $E_{out}$ in a scanned manner as described above with reference to FIG. 1. The servo mechanism 262 scans the antenna 260 under control via the $S_{scan}$ port from the computer 290. The computer 290 also receives information from the mechanism 262 via the $S_{scan}$ port providing confirmation that it is functioning correctly; this is especially important for safety critical situations.

In FIG. 2, the encoding signal $S_{code}$ is a serial stream of binary data having logic values 0 or 1; these values occur with substantially equal probability in the encoding signal $S_{code}$ on account of its pseudo-random nature. The modulator unit 230 is arranged to phase modulate the signal $S_y$ in response to these logic values by switching its phase from 0 to 180° relative to the signal $S_x$ to provide the signal $S_z$.

The reference signature code mentioned above will now be explained in more detail. In the road, a section 10 of which is illustrated in FIG. 1, there will often be a large number of vehicles. When each of these vehicles incorporates the apparatus 70, they will frequently be within communication range of one another. As a result of this, there arises a risk of interference and associated data corruption of radiation emitted from and received at these vehicles from their respective apparatus 70, especially if they employ identical signature codes to one another. Data corruption is potentially dangerous to vehicle safety. In order to improve safety, the signature code is arranged to be unique for each of the vehicles to within limitations imposed by code bit length. The signature code incorporates within it maximum length pseudo-random sequence codes (MLSC) concatenated together which exhibit advantageous properties such as insensitivity to corruption from Doppler frequency shift arising due to movement of the vehicles relative to one another. Properties of MLSC are explained in a number of publications, for example in a book "Shift Register Sequences" by S W Golomb, published by Aegean Park Press 1982 and also in a publication "Cross Correlation Properties of Pseudo-Random and Related Sequences" by D Sarwarte and M Pursley, Proc. IEEE May 1980. MLSCs will be explained in more detail later.

As a further precaution to avoid interference, radiation bearing the signature code is repeatedly emitted from the antenna 260 at intervals whose durations are temporally jittered. This alleviates a problem situation where two interrogators 80 repeatedly, in synchronism, attempt to interrogate a transponder, 90. The intervals are jittered in time steps of 15.4 μsec so that intervals between emission of radiation are in a range of 15.4 μsec to 154 μsec as described by Equation 1:

$$T = p\Delta t \quad \text{Eq. 1}$$

where

T=an interval between two emissions of radiation;

Δt=time step duration, 15.4 μsec; and p=jitter coefficient (an integer in a range 1 to 10).

The interval T is jittered in at least one of a random timing sequence and a pre-recorded timing sequence, namely values for p are varied in at least one of a random sequence and pre-recorded sequence. This reduces the risk of repeated unsuccessful interrogation of the transponder 90; unsuccessful interrogation of the transponder 90 results in its trajectory not being established by the interrogators 80 with associated risk of unreliable collision assessment.

Each vehicle bearing the apparatus 70 is provided with its own individual signature code comprising six concatenated MLSCs. Although MLSCs are known, use of concatenated MLSCs for providing identification codes for road vehicles is not; concatenation of MLSCs provides more unique code combinations for a corresponding number of code bits than a single MLSC having an equivalent number code bits.

The six MLSCs provided for the apparatus 70 each have a length of 127 bits which results in their associated reference signature code having a length of 762 bits. By appropriate choice of the 762 bits, 13 366 080 different signature codes are possible. When provided to the modulator unit 230, bits in the signal $S_{code}$ are each arranged to have a duration of 10 ns, corresponding to a clocking rate of 100 MHz for logic devices incorporated within the generator unit 240. The 10 ns duration is chosen to correspond to a measurement resolution of 1.5 m; this duration also corresponds to a free-space radiation propagation distance of 3 m. The signature code thereby enables the apparatus 70 to cope with measuring relative vehicle speeds of up to 200 km/hour.

Generation of the signature code will now be further explained. The MLSCs are generated earlier using a known computer algorithm and then preloaded into a solid state memory device incorporated into the code generator unit 240 during its initial manufacture. MLSCs are alternatively producable using a conventional linear shift register including a number of stages and incorporating a number of feedback tappings connected to outputs from a number of the stages, and then summing the tappings into a modulo-2 adder to provide an MLSC output which also serves as input data to the shift register.

When the MLSCs are 127 bits long, there are eighteen different unique possible series of pseudo-randomly changing bits. Six of these series, none identical to one another, are concatenated within the generator unit 240 to provide the interrogator 80 with its associated signature code comprising 762 bits.

Thus, referring again to FIG. 1, the interrogator 80 of the first vehicle 30 emits radiation from its antenna 260; the radiation is encoded with its corresponding individual unique pseudo-random signature code. The radiation propagates from the antenna 260 along the carriageway 20 until received by the transponder 90 of the second vehicle 40. The transponder 90 will now be described in more detail.

Figure 3:
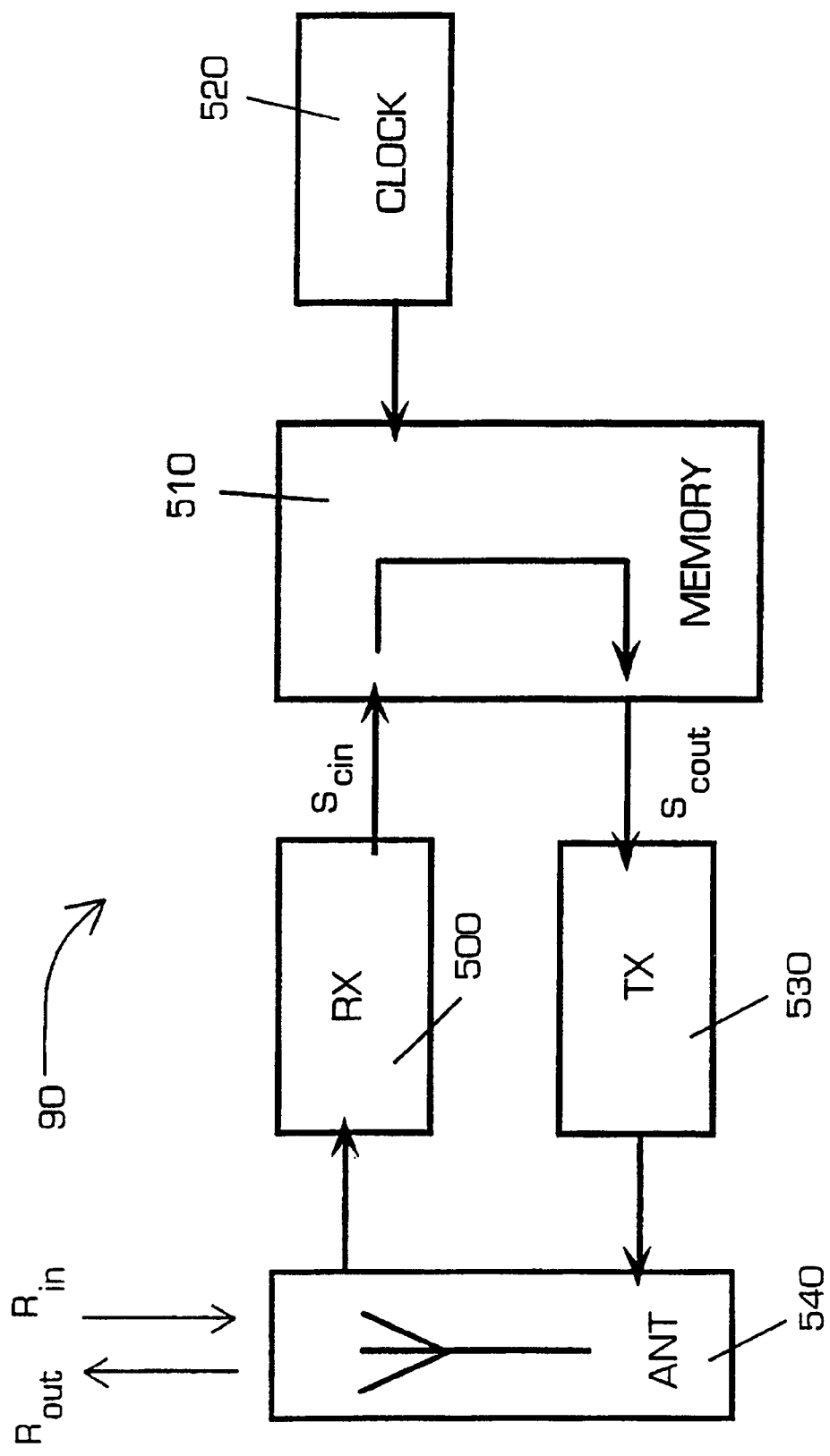
FIG. 3 illustrates schematically a transponder incorporated into the apparatus shown in FIG. 1.

Referring now to FIG. 3, there is shown a representation of the transponder 90. The transponder 90 comprises a receiver unit (RX) 500, a memory unit (MEMORY) 510, a clock unit (CLOCK) 520, a transmitter unit (TX) 530 and a wide beam angle antenna (ANT) 540. The receiver unit 500 and the transmitter unit 530 are connected to and share the antenna (ANT) 540. The antenna 540 is not mechanically rotationally scanned but is directed rearwardly from the vehicle 40. The receiver unit 500 and the transmitter unit 530 are a conventional millimetric receiver and transmitter respectively adapted for receiving and transmitting phase-coded waveforms; they are well known in the art.

The antenna 540 includes a signal output which is connected to an input of the receiver unit 500. The receiver unit 500 incorporates a digital $S_{cin}$ signal output which is connected to a first digital signal input of the memory unit 510. The clock unit 520 incorporates a digital output which is connected to a second digital input of the memory unit 510. The memory unit 510 includes a digital $S_{cout}$ signal output which is connected to a modulation input of the transmitter unit 530. The transmitter unit 530 incorporates a signal output which is connected to a signal input of the antenna 540.

Operation of the transponder 90 will now be described with reference to FIG. 3. The antenna 540 receives interrogating radiation $R_{in}$ from the interrogator 80 of the first vehicle 30 and provides a received signal in response thereto for the receiver unit 500. The radiation $R_{in}$ has a frequency of 77 GHz and is encoded with its associated signature code as described above. The unit 500 demodulates the received signal and extracts therefrom its signature code $S_{cin}$ corresponding to $S_{code}$ in FIG. 2. The code $S_{cin}$ comprises a series of logic bits of value 0 or 1 arranged to form a signature code incorporating concatenated MLSCs. The memory unit 510 receives the code $S_{cin}$, stores it and then performs a validation function on it to verify that it is of an expected length of 762 bits and that logic values 0 and 1 occur therein with equal probabilities as characteristic of a pseudo-random logic signal. When verified, the memory unit 510 then outputs the code $S_{cin}$ after a fixed delay as an output signal $S_{cout}$ comprising a stream of logic bits of value 0 or 1. The signal $S_{cout}$ is received at the retransmitter unit 530 which phase modulates it onto a 77 GHz carrier signal in a similar manner to the modulator unit 230 of the interrogator 80 to provide a modulated encoded signal which is emitted from the antenna 540 as return radiation $R_{out}$.

Figure 4:
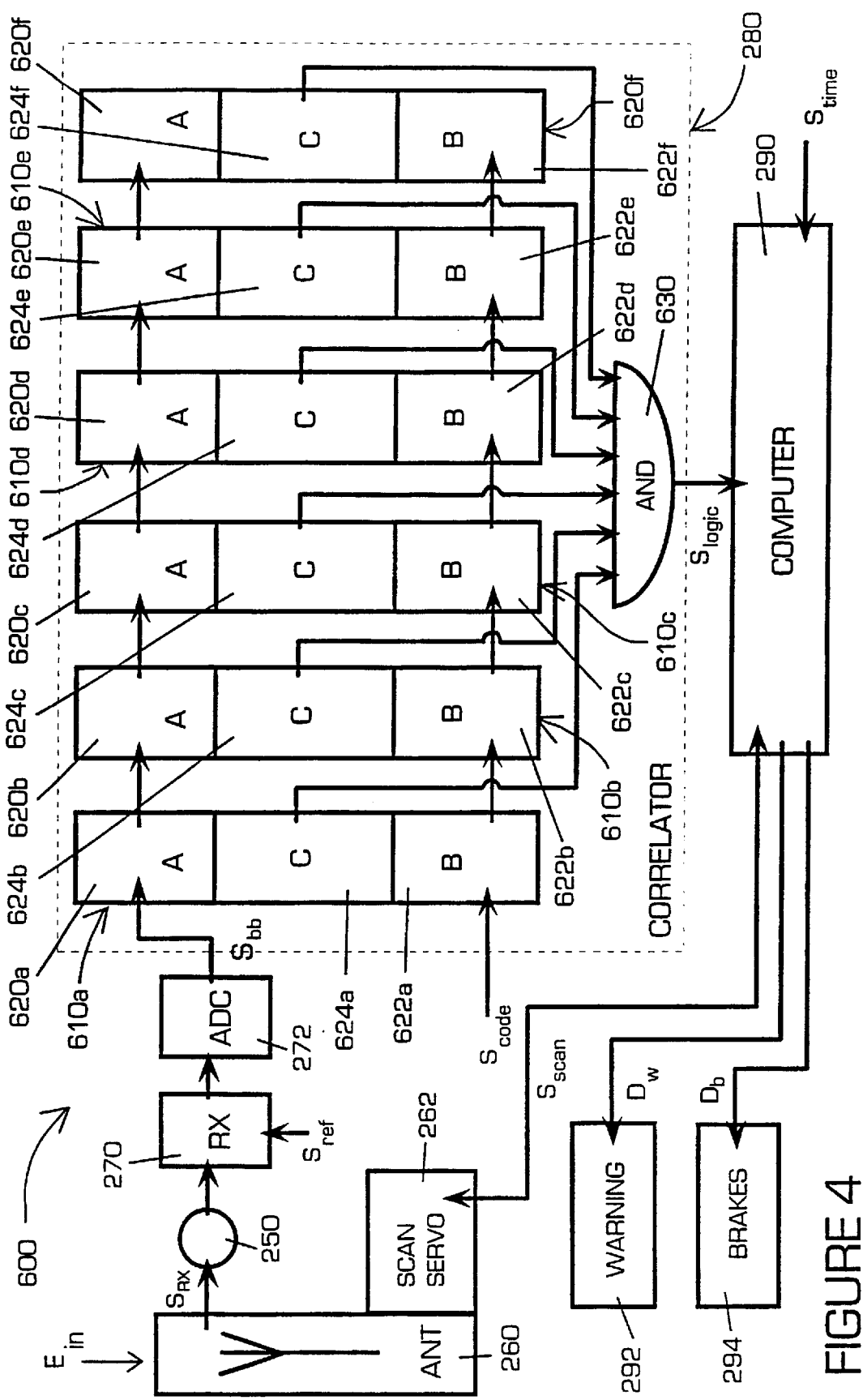
FIG. 4 illustrates schematically a receiver module of the interrogator incorporated into the apparatus shown in FIG. 1.

Referring now to FIG. 4, there is shown a receiver module of the interrogator 80. The module, indicated generally by 600, incorporates the circulator unit 250, the antenna 260, the receiver unit 270, the converter unit 272, the correlator unit 280, the computer 290, the warning unit 292 and the servo unit 294 shown in FIG. 2. The antenna 260 includes a $S_{RX}$ signal output which is connected via the circulator 250 to a first signal input of the receiver unit 270. The converter unit 272 incorporates a digital $S_{bb}$ output which is connected to a first correlation input of the correlator unit 280. The unit 270 includes a second signal input for receiving a local oscillator signal $S_{ref}$. The correlator unit 280 incorporates a second correlation input for receiving a signature code signal $S_{code}$ generated by the code generator unit 240. The correlator unit 280 includes a $S_{logic}$ logic signal output which is connected to a first logic input of the computer 290. The computer 290 incorporates three logic outputs connected to the warning unit 292, and brake servo unit 294 and to the scanning servo mechanism 262.

The correlator unit 280 will now be described in more detail. It incorporates six 127-bit correlators 610a, 610b, 610c, 610d, 610e, 610f. Each of the correlators 610 includes:

(a) a first 127-bit register (A), for example a first register 620a, for receiving a first sequence of data;

(b) a second 127-bit register (B), for example a second register 622a, for receiving a second sequence of data; and (c) a correlation network (C), for example a network 624a, having an output which is connected to corresponding input of a six input AND gate 630.

Operation of the module 600 will now be described with reference to FIG. 4. The return radiation $R_{out}$ emitted from transponder 90 shown in FIG. 3 is received as return radiation $E_{in}$ at the antenna 260 to provide a received signal $S_{RX}$ therefrom. The receiver unit 270 receives the signal $S_{RX}$ and heterodynes it with the signal $S_{ref}$ from the oscillator unit 210 to provide a digital demodulated base band signal which is converted into a digital signal $S_{bb}$ which comprises the signature code retransmitted from the transponder 90. The signal $S_{bb}$ thus includes a pseudo-random sequence of 762 data bits of value logic 0 or 1. The receiver unit 270 is configured so it does not respond to return radiation $R_{out}$ whose intensity is less than a preset threshold. This determines a maximum range to which the interrogator 80 is responsive.

When the timing unit 244 in FIG. 2 provides the timing signal $S_{time}$ to the code generator unit 240 and to the computer 290, the generator unit 240 outputs the encoding signal $S_{code}$ comprising the reference signature code to the modulator unit 230, it also simultaneously provides the signal to the correlator unit 280. The computer 290 uses receipt of the timing signal $S_{time}$ for determining a point in time $t_1$ when the interrogating radiation $E_{out}$ is emitted from the antenna 260. The correlator unit 280 receives the signal $S_{code}$ and shifts it into the second registers 622 so that each of the six MLSCs contributing to form the reference signature code included in $S_{code}$ becomes stored in its associated register 622. Storage of the signal $S_{code}$ in the registers 622 is completed prior to receipt of the signal $S_{bb}$ at the correlator unit 280 from the receiver unit 270 via the converter unit 272.

The correlator unit 280 receives the signal $S_{bb}$ and shifts it sequentially into the first registers 620. Each correlator 610 provides an output signal which is of logic 0 value when data contained in its first register 620 and its second registers 622 have a threshold or lesser number of bits which mutually correlate, and of logic 1 value when data contained in said registers 620, 622 have more than the threshold number of bits which mutually correlate. When the signal $S_{bb}$ is shifted into the second registers 622 and correlation thereof with the signature code contained in the first registers 620 occurs resulting in the outputs from the correlators 610 switching to logic state 1, an output from the AND gate 630 momentarily undergoes a logic state transition from a logic 0 value to a logic 1 value and back to a logic 0 value again. The computer 290 detects this transition and records a point in time $t_2$ where it occurs.

The threshold is preset to 100 bits. It is alterable in a range of 50 bits to 125 bits to cope with varying degrees of interference and data corruption which is encountered in many traffic environments. When interference is encountered, bits of the signature code received will occasionally be corrupted. If the threshold is set to a value less than 50 bits, data corruption gives rise to spurious correlations resulting in misleading logic state transitions at the output from the AND gate 630. This gives rise to false proximity estimations made by the computer 290. Such spurious correlations will be referred to as sidelobe correlations. If the threshold is set to a higher value of 125 bits, there is a risk, in a microwave noisy environment, that the apparatus 70 fails to detect a vehicle on a potential collision trajectory.

Sidelobe correlations occur more frequently in a situation where interference is encountered when the MLSCs concatenated to form the signature code signal $S_{code}$ are relatively short, for example when they are 30 bits long. Setting each MLSC length to 127 bits in the code signal $S_{code}$ results in a lower risk of sidelobe correlations whereas a greater number of unique signature codes is possible by concatenating a larger number of shorter MLSCs. For example, four concatenated MLSCs each of 31 bits length give rise to 360 unique possible signature codes of 124 bits length but relatively more prominent sidelobe correlation whereas two concatenated MLSCs of 63 bits length give rise to 30 unique possible signature codes of 126 bits length but relatively less prominent sidelobe correlation.

The computer 290 then calculates, using the times $t_1$, $t_2$, distance of the transponder 90 providing the return radiation $E_{in}$ from the interrogator 80. Bearing of the transponder 90 is calculated by the computer 290 from the mainbeam direction of the antenna 260 because scan direction thereof is under control of the computer 290 via the servo mechanism 262. The computer 290 then stores data in its memory regarding bearing and distance of the transponder 90.

By performing repeated interrogations of the transponder 90, the interrogator 80 records a series of distance and bearing data relating thereto and calculates therefrom a trajectory of the transponder 90 relative to the interrogator 80. If the trajectory calculated by the computer 290 corresponds to potential collision between the interrogator 80 and the transponder 90, the computer 290 sends a signal to the warning unit 292 to provide visual and audible warning to a driver of the vehicle 30. If the trajectory does not change within a set period after sending the signal to the warning unit 292, the computer 290 sends a signal to the brake servo unit 294 to apply brakes of the vehicle 30, thereby overriding the driver to avoid vehicular impact.

Figure 5:
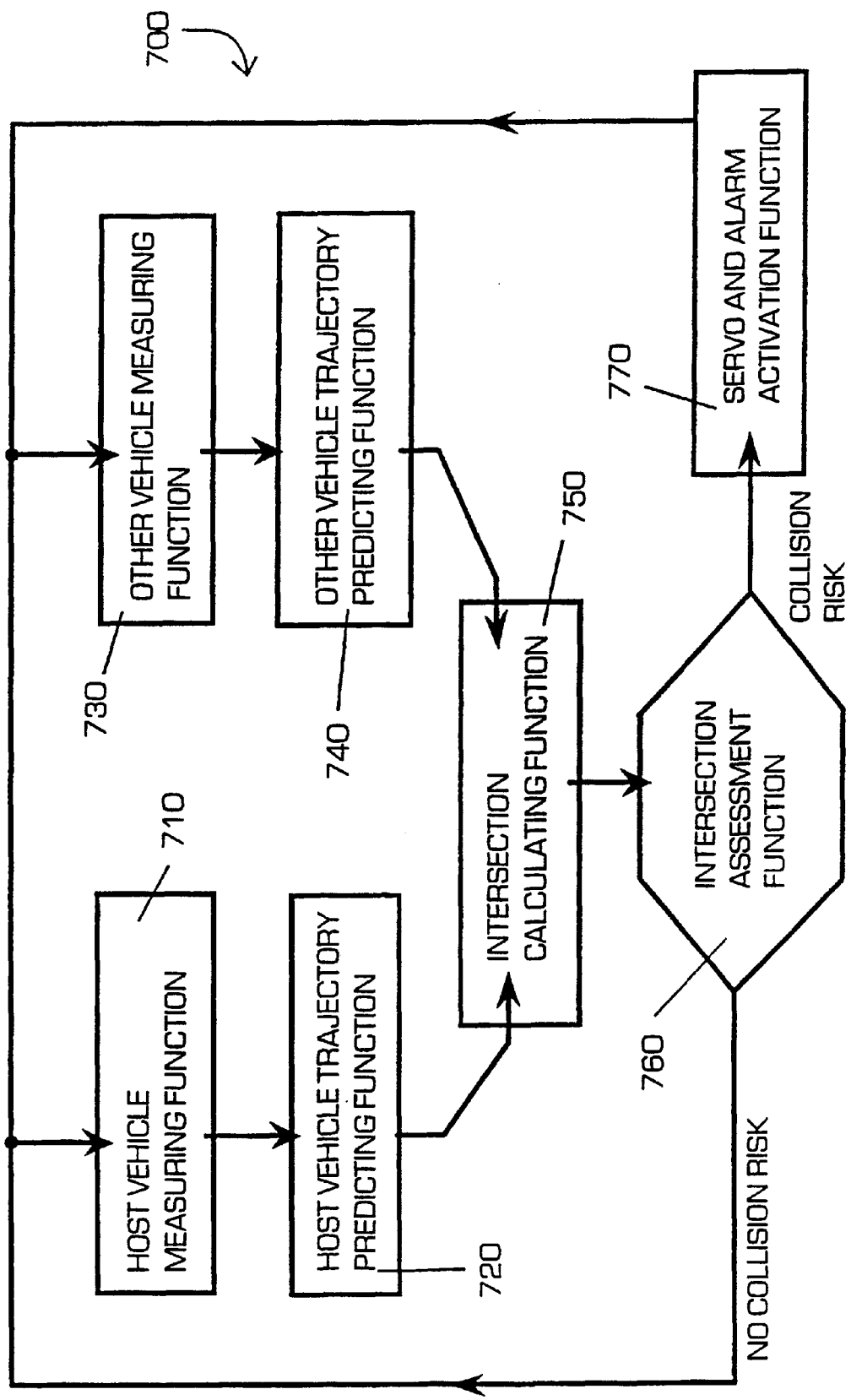
FIG. 5 illustrates a sequence of functions performed in a computer incorporated into the interrogator shown in FIG. 2.

Referring now to FIG. 5, there is shown a sequence of computing functions indicated generally by 700. The sequence of functions 700 is encoded into software executable by the computer 290 incorporated into the interrogator 80 of the vehicle 30. The vehicle 30 will be referred to as a host vehicle. The sequence 700 comprises a host vehicle measuring function 710, a host vehicle trajectory predicting function 720, an other vehicle measuring function 730, an other vehicle trajectory predicting function 740, an intersection calculating function 750, an intersection assessment function 760 and a servo and alarm activation function 770.

Operation of the interrogator 80 according to the sequence 700 will now be described with reference to FIG. 5. The computer 290 firstly executes the measuring function 710 which makes it scan its sensor input which is connected to the sensor unit 296 to determine therefrom velocity of the host vehicle from the accelerometers, the electronic compass and the vehicle wheel turning rate sensor incorporated in the sensor unit 296. The computer 290 then executes the function 720 to calculate host vehicle trajectory from measurements made during a most recent and previous executions of the measuring function 710. Concurrently with executing the functions 710, 730, the computer 290 firstly executes the measuring function 730 to obtain measurements of distance and direction of other vehicles from the host vehicle by analysing retransmitted pseudo-randomly encoded return radiation received at the host vehicle. Next, the computer 290 executes the predicting function 740 to calculate trajectories of the other vehicles from the measurements made during a 30 most recent and previous executions of the measuring function 730. When the functions 710 to 740 are completed, the computer 290 then executes the calculating function 750 which makes the computer 290 calculate using information from the predicting functions 720, 740 whether or not there is a risk of collision between the host vehicle and any one of the other vehicles. If there is a likelihood of collision, the computer 290 then executes the assessment function 760 which makes the computer 290 warn a driver of the host vehicle by passing data to the activation function 770.

If, when executing the assessment function 760, the computer 290 detects that the driver has not modified trajectory of the host vehicle to avoid collision, the computer 290 passes information to the activation function 770 to cause brakes of the host vehicle to be applied. If, when executing the assessment function 760, the computer detects that a collision is not likely, the computer 290 continues by repeating execution of the sequence of functions 700 commencing at the measuring functions 710, 730. The computer 290 is arranged to execute the sequence 700 repetitively.

The predicting functions 720, 740 employ Kalman filtration algorithms to cope with noisy proximity information provided from the measuring functions 710, 730. In practice, for example due to spurious correlations occurring in the correlator 280, trajectories calculated by the predicting functions 720, 740 will be uncertain. To improve trajectory estimation, the functions 720, 740 are prearranged to contain Kalman trajectory models for anticipating relative vehicle movement. The models are supplied with proximity information from the measuring functions 710, 730 and provide a best estimate of trajectory by applying averaging and least squares data fitting algorithms to current and preceding proximity information.

Referring to FIG. 3, the fixed delay provided by the memory unit 510 is important for enabling the interrogator 80 to differentiate between return radiation from other vehicles each equipped with a transponder 90 and spurious multipath reflections of interrogating radiation from stationary roadside objects which reflect radiation without this delay. When the delay is set to be greater than time of flight associated with simple reflection between emitting the radiation $E_{out}$ from the interrogator 80 and receiving the radiation $E_{in}$ reflected from stationary roadside objects, the interrogator 80 is capable of rejecting multipath reflections by ignoring reflections received prior to the delay after emitting interrogating radiation. The delay may, alternatively, be set to a short time period of just greater than required to transmit the signature code, for example 7.7 $\mu$sec for 762 code bits each of 10 ns duration, thereby easing memory capacity requirements of the memory unit 510. When numerous apparatus 70 are operated within range of one another, the delay is set to be identical for each of the apparatus 70.

The transponder 90 may alternatively be arranged to receive interrogating radiation $R_{in}$ at a first frequency $f_1$, for example $f_1$=77 GHz, and emit corresponding return radiation $R_{out}$ in response after the fixed delay at a second frequency $f_2$, for example $f_2$=78 GHz. The first frequency $f_1$ and the second frequency $f_2$ are chosen to be sufficiently different for the interrogator 80 to distinguish between them. The interrogator 80 and the transponder 90 incorporate Gunn diode oscillators which generate the frequencies $f_1$, $f_2$. Dual frequency operation provides an advantage that multipath reflections from stationary roadside objects will return radiation to the interrogator 80 at the frequency $f_1$ whereas delayed return radiation from other vehicles, each incorporating a transponder 90, received at the interrogator 80 will be at the frequency $f_2$. This enables the apparatus 70 to cope with multipath reflections.

Figure 6:
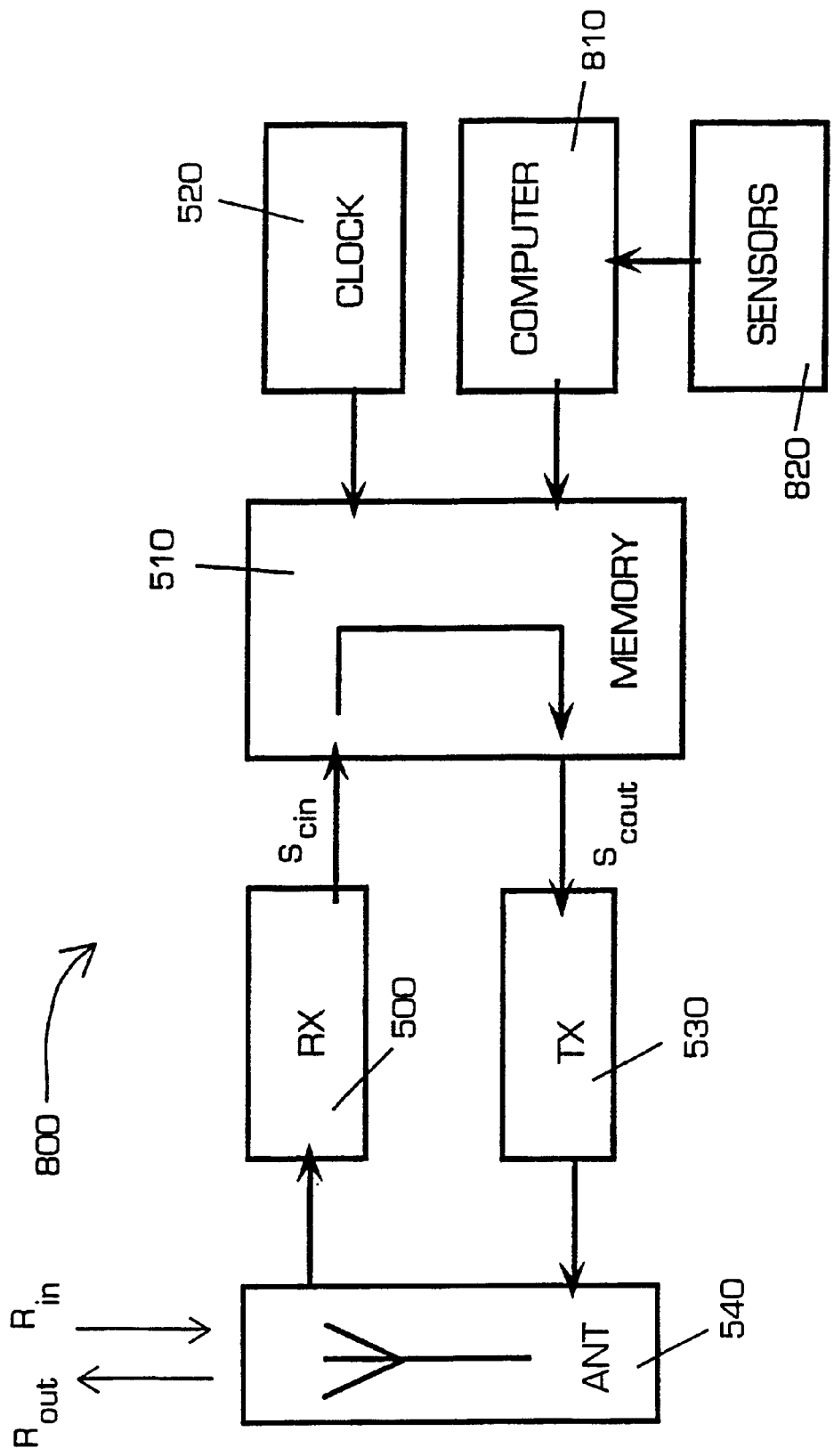
FIG. 6 illustrates schematically an alternative transponder for use in the apparatus shown in FIG. 1.

Referring now to FIG. 6, there is shown a transponder indicated generally by 800. It is incorporated into the second vehicle 40 and incorporates the receiver unit 500, the memory unit 510, the clock unit 520, the transmitter unit 530 and the wide beam angle antenna 540. The receiver unit 500 and the transmitter unit 530 are connected to and share the antenna 540. The antenna 540 is not mechanically rotationally scanned but is directed rearwardly from the vehicle 40. The receiver unit 500 and the transmitter unit 530 are a conventional millimetric receiver and transmitter respectively adapted for receiving and transmitting phase-coded waveforms. The transponder 800 also incorporates a computer 810 and a sensor unit 820. The sensor unit 820 comprises a sensor output which is connected to an input of the computer 810. The computer 810 incorporates a digital output which is connected to a second data input of the memory unit 510.

The antenna 540 includes a signal output which is connected to an input of the receiver unit 500. The receiver unit 500 incorporates a digital $S_{cin}$ signal output which is connected to a first digital signal input of the memory unit 510. The clock unit 520 incorporates a digital output which is connected to a second digital input of the memory unit 510. The memory unit 520 includes a digital $S_{cout}$ signal output which is connected to a modulation input of the transmitter unit 530. The transmitter unit 530 incorporates a signal output which is connected to a signal input of the antenna 540.

Operation of the transponder 800 will now be described. The sensor unit 820 receives information as analogue signals from sensors (not shown) within the vehicle 40 and converts the signals to digital data using analogue-to-digital converters incorporated therein. The sensors monitor status of the vehicle 40, for example its speed as measured from rotation rate sensors coupled to wheels thereof, its acceleration as measured using accelerometers mounted therein, its orientation as measured using a mechanical or electronic compass incorporated therein, and its engine status as measured using fuel flow and pressure sensors mounted on an engine of the vehicle 40.

Interrogating radiation $R_{in}$ is received from the interrogator 80 at the antenna 540. The radiation $R_{in}$ has a frequency of 77 GHz and is encoded with its associated signature code as described above. The unit 500 demodulates the radiation $R_{in}$ and extracts therefrom its signature code $S_{cin}$ corresponding to $S_{code}$ in FIG. 2. The memory unit 510 receives the code $S_{cin}$ stores it and then performs a validation function on it to verify that it is of an expected length of 762 bits and that logic values 0 and 1 occur therein with substantially equal probabilities as characteristic of a pseudo-random logic signal.

Figure 7:
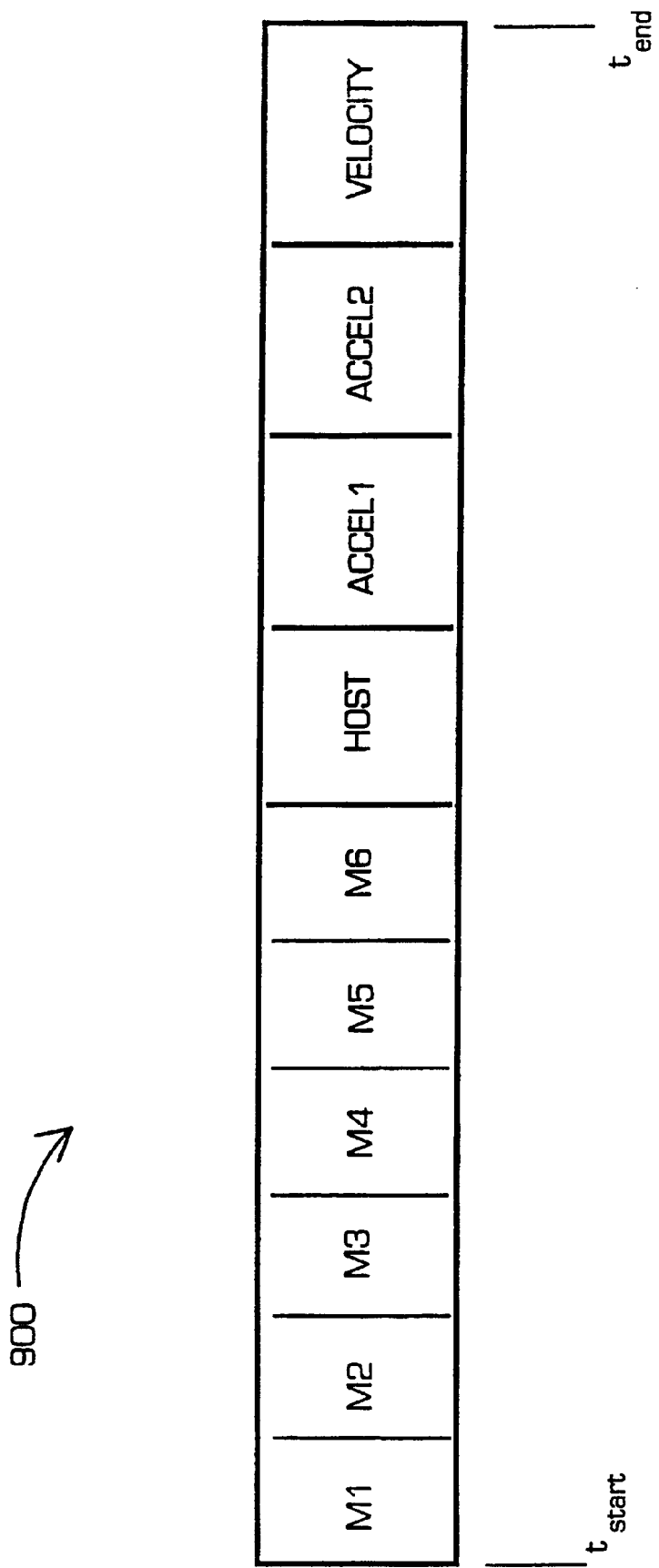
FIG. 7 illustrates construction of a signal suitable for emission from the transponder shown in FIG. 6.

The computer 810 scans the sensor unit 820 and receives information gathered from the sensors connected thereto as described above. The computer 810 then inserts this information into the memory unit 510 as appended data following data corresponding to the signature code $S_{cin}$. After the fixed delay, data from the memory unit 510 is output as the output signal $S_{cout}$. The signal $S_{cout}$ is received at the retransmitter unit 530 which phase modulates it onto a 77 GHz carrier signal in a similar manner to the modulator unit 230 of the interrogator 80 to provide a modulated encoded signal which is emitted from the antenna as return radiation $R_{out}$ The computer 810 may add information in the appended data indicative of vehicle type and its owner. This provides an advantage that the alternative embodiment is usable as an electronic number plate, thereby facilitating automatic road tolling for example; use of concatenated pseudo-random signature codes is particularly important for electronic number plate applications to provide a plurality of unique signature codes. Moreover, the receiver unit 500 and the transmitter unit 530 may operate at different frequencies, for example 77 GHz and 78 GHz respectively as described above. FIG. 7 illustrates partitioning of the signal $S_{cout}$ in the transponder 800 and is indicated by 900. The signal 900 comprises:

(i) a signature code comprising six MLSCs of 127 bits length (M1, M2, M3, M4, M5, M6);
(ii) data relating to host vehicle type and its functional status (HOST), e.g. its engine functional status;
(iii) data relating to cross-track acceleration (ACCEL1), namely host vehicle acceleration in a direction orthogonal to its direction of travel;
(iv) data relating to along-track acceleration (ACCEL2), namely host vehicle acceleration in its direction of travel; and
(v) data relating to host vehicle velocity (VELOCITY) as derived by the computer 810 from magnetic compass and wheel rotation rate sensors.

The signal 900 is output to the retransmitter unit 530 commencing with the MLSC M1 at a time $t_{start}$ and finishing with the data relating to velocity at a time $t_{end}$.

The computer 810 may omit one or more of the data in (iii) to (iv) from the signal $S_{cout}$ to reduce its complexity.

The data provided by the transponder 800 in the return radiation $R_{out}$ in addition to the signature code may be used by an interrogator 80 to supplement distance and bearing information that it derives itself from antenna scan direction and timings $t_1$, $t_2$.

A GPS receiver may also be linked to the transponder 800 so that it provides location information encoded into the return radiation $R_{out}$. This provides an advantage of being an absolute positional reference on the earth's surface whereas the apparatus 70 shown in FIG. 1 incorporating the transponder 90 provides only a relative measurement of the vehicle 30, 40 positions.

Figure 8:
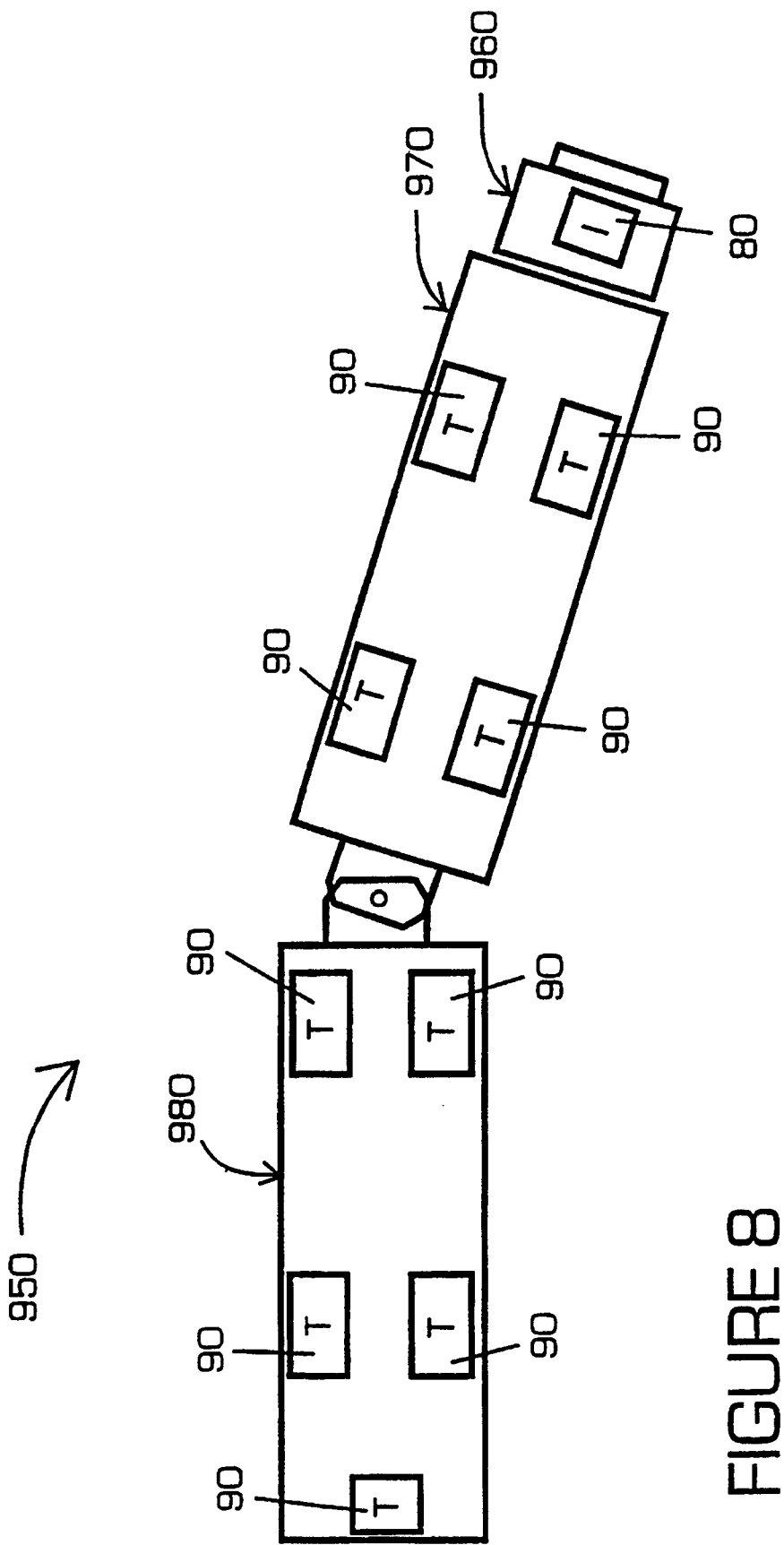
FIG. 8 illustrates a lorry bearing a number of transponders shown in FIGS. 4 and 7 mounted along it.

Referring now to FIG. 8, there is shown a plan view an articulated lorry indicated generally by 950. The lorry is 30 metres long and incorporates a front cab 960, a main section 970 and a pivoting trailer 980. The lorry 950 incorporates a number of the transponders 90 at side regions along its length as shown in FIG. 8 in addition to an interrogator 80 at the cab 960 and a transponder 90 at a rear region thereof. This increases safety, particularly when there is a risk of impact of other vehicles bearing the apparatus 70 into the side regions of the lorry 950 where the transponders 90 are mounted.

Although the signature code 900 described above incorporates six concatenated MCSLs, each of 127 bits length, which results in the code 900 having a length of 762 bits, alternative embodiments of the invention may use signature codes whose length, number of concatenated MLSCs and MLSC length is different to the code 900. For example, an alternative signature code may incorporate three concatenated MLSCs, each of 255 bits length resulting in a signature code length of 765 bits.

A probability of identical codes being used simultaneously by two interrogators 80 operating within communication range of one another decreases as signature code length increases. Six MLSCs, each MLSC of 127 bits length, concatenated together provide 13 366 080 different possible signature code combinations. This provides an advantage of more different code combinations than is available by employing a single non-concatenated pseudo-random code of 762 bits length.

In order to illustrate relative trade-off between code length and associated number of combinations, a number of different signature code constructions are listed in Table 1 together with their associated characteristics. In Table 1:

(i) n is a number of stages required in a shift register for generating a MLSC of length $C_{length}$, namely $C_{length}$ is MLSC length in bits;

(ii) $N_{combin}$ is the number of pseudo-random combinations possible using $C_{length}$ number of bits;

(iii) $N_{concat}$ is a number of the MLSCs which, if concatenated together, provide $N_{signat}$ number of different signature codes; and (iv) $T_{combin}$ is a time interval required for transmitting a signature code incorporating $N_{concat}$ MLSCs, each MLSC of $C_{length}$ bits length, allowing for 10 ns transmission duration for each signature code bit.

The reference signature code described above comprising six concatenated MLSCs of 127 bits length is a compromise between signature code length, transmission time duration and risk of duplicate codes being used simultaneously when two apparatus 70 are within communication range of one another. In one example signature code in Table 1 which has a signature code length of 131 071 bits, $T_{combin}$ is 2.62 msec which becomes comparable to a dwell time of 7.9 msec for the apparatus 70; selection of a signature code of this length is inappropriate especially if the interrogator 80 is required to interrogate a number of transponders 90 positioned along a searching direction of the antenna 260, for example in a situation where a transponder 90 is interrogated simultaneously by more than one interrogator 80 requiring subsequent re-interrogation of the transponder 90 after a jittered time delay.

TABLE 1

| n | $C_{length}$ (bits) | $N_{combin}$ | $N_{concat}$ | $N_{signat}$ | $T_{combin}$ ($\mu$sec) |
|---|---|---|---|---|---|
| 5 | 31 | 6 | 6 | 720 | 0.18 |
| 7 | 127 | 18 | 5 | 1028160 | 6.35 |
| 7 | 127 | 18 | 6 | 13366080 | 7.62 |
| 9 | 511 | 48 | 4 | 4669920 | 20.4 |
| 9 | 511 | 48 | 5 | 205476480 | 25.5 |
| 11 | 2047 | 176 | 3 | 5359200 | 61.4 |
| 13 | 8191 | 630 | 3 | 24857560 | 245 |
| 15 | 32767 | 1800 | 2 | 3238200 | 655 |
| 17 | 131071 | 7710 | 2 | 59436390 | 2620 |

In Table 1, $C_{length}$ and $N_{combin}$ are calculable from Eq. 2 and Eq. 3 respectively:

$$C_{length} = 2^n - 1 \qquad \text{Eq. 2}$$

$$N_{combin} = \left(\frac{C_{length}}{n}\right) \Pi\left(1 - \frac{1}{P_i}\right) \qquad \text{Eq. 3}$$

where n=number of shift register stages; and $P_i$=prime factors of n.

Binary signature codes generated by concatenating pseudo-random sequences of binary bits provide more unique code combinations than signature codes each incorporating only a single unconcatenated pseudo-random sequence of binary bits. Concatenation of pseudo-random sequences therefore provides an important advantage when a unique signature code is required for each vehicle to distinguish it from other vehicles. To illustrate this advantage, Table 2 provides a comparison of code combinations length and number of corresponding unique codes for concatenated and unconcatenated pseudo-random sequences.

TABLE 2

| Signature code length (bits) [a] | Number of combinations (unconcatenated) [b] | Number of combinations (2 concatenated sequences) [c] | Number of combinations (3 concatenated sequences) [d] |
|---|---|---|---|
| 3 | 1 | | |
| 7 | 2 | | |
| 15 | 2 | 2 | 2 |
| 31 [e] | 6 [f] | | |

TABLE 2-continued

| Signature code length (bits) [a] | Number of combinations (unconcatenated) [b] | Number of combinations (2 concatenated sequences) [c] | Number of combinations (3 concatenated sequences) [d] |
|---|---|---|---|
| 62 | | 30 [g] | |
| 63 | 6 | | |
| 93 | | | 360 [h] |
| 127 | 18 [i] | | |
| 255 | 16 | 306 [j] | |
| 381 | | | 4896 [k] |
| 511 | 48 | | |

In Table 2, column [a] corresponds to signature code length in bits. Column [b] corresponds to the number of unique pseudo-random combinations which can be generated for a corresponding signature code length [a]; for example, a signature code of seven bits length can appear only in two unique pseudo-random sequences, a signature code of 31 bits length [e] can appear only in six [f] unique pseudo-random sequences, and so on.

If two pseudo-random sequences of thirty one bits length [e] are concatenated together to provide a signature code of sixty two bits length, then thirty [g] unique signature codes are possible, namely [f] 6×(6-1)=30 [g] combinations are possible since two identical pseudo-random sequences concatenated together are not allowable for signature code generation.

If three pseudo-random sequences of thirty one bits length [e] are concatenated to provide a signature code of ninety three bits length, then three hundred and sixty [h] unique code combinations are possible. This number of combinations is considerably greater than provided in a signature code consisting of an unconcatenated pseudo-random sequence of one hundred and twenty seven bits which provides only eighteen [i] different combinations.

Table 2 illustrates that it is advantageous to use signature codes comprising concatenated pseudo-random bit sequences rather than signature codes each comprising merely a single sequence of pseudo-random bits, especially when a many unique signature codes a required for distinguishing many vehicles from one another. In practice, a signature code incorporating six concatenated MLSCs each of 127 bits length is found to be a satisfactory compromise between number of code combinations possible and signature code length.

Although incorporation of the proximity detecting apparatus 70 into road vehicles is described above, it may alternatively be incorporated into other types of vehicles, for example:

(a) onto bicycles;

(b) into aircraft such as gliders and hanggliders; and (c) into aquatic vehicles, for example into windsurfing boards, yachts and power boats.

The apparatus 70 may also be adapted to make it personnel wearable, for example by mounting it onto a bicycle or motorcycle helmet, or onto a life jacket. It may, for example, be worn by skiers.

Moreover, the apparatus 70 may be adapted to operate by emitting and receiving radiation at other wavelengths, for example at infra-red radiation wavelengths in a range of 3 $\mu$m to 12 $\mu$m. This provides an advantage that antennae of the apparatus 70 may be substituted by optical components such as lenses, laser diodes and infra-red photodetectors.

In an alternative embodiment of the invention, the antenna 260 and its associated scanning servo mechanism 262 may be substituted with a phased array of elements providing a polar gain response which is electronically steerable from the computer 290. This provides an advantage that the interrogator 80 may be constructed so that it does not incorporate moving mechanical parts, thereby increasing its reliability and potential angular scanning rate. This provides an advantage that trajectories of other vehicles incorporating the apparatus may be more frequently determined, thereby improving accuracy of collision risk estimated by the apparatus.

Moreover, in the alternative embodiment, monopulse techniques may be used to provide the antenna 260 with a narrower effective beamwidth, thereby enabling the apparatus 70 to determine directions of other road vehicles relative to it with enhanced precision. Monopulse techniques are known to those skilled in radar system design.

A general property of MLSCs, often referred to as pseudo-random noise sequences, is that the number of unique MLSC sequences available increases as their length increases; additionally, their associated correlation properties, namely reduced sidelobe generation in the correlator 280 when correlated as described above, improve as their length increases. However, there is a limit to the length of MLSC that is employable in the apparatus 70 on account of dwell time of a transponder 90 receiving encoded radiation and a requirement to both receive and transmit from an interrogator 90. There therefore arises, when designing the apparatus 70, a trade-off between longer MLSCs with desirable correlation properties, and a need for a sufficiently short transmission time to transmit the concatenate MLSCs to allow for reception of return radiation at interrogators 80.

As an alternative to employing concatenate MLSCs to generate the signature code, other types of concatenated codes may be employed to generate it. Gold codes are particularly suitable for use in the apparatus 70 on account of their desirable correlation characteristics which result in reduced sidelobe generation compared to many MLSCs when they are correlated within the interrogator 80. These codes are described in a publication "Optimal Binary Sequences for Spread Spectrum Multiplexing" by R Gold, IEEE Trans. on Information Theory Vol IT 13, no. 4 October 1967 pp 619–621.

Gold codes can be generated by any one of the following methods:

(i) using specially connected logic shift registers similar to those used for generating MLSCs;

(ii) using software arranged to simulate the specially connected shift registers in (i) above; and (iii) using software arranged to search a large selection of possible codes and identifying those codes which satisfy Gold code correlation criteria; the large selection of codes may comprise selected MLSCs for example.

Gold codes are sequences, not limited to pseudo-random sequences, of bits. Each Gold code has a period $2^n-1$ where n is a degree of a polynomial employable, or alternatively the number of stages of a specially connected shift register required, to generate the sequences. They are distinguished from other types of code in that they give rise to a correlation function θ satisfying an equality as defined in Eq. 4:

$$\theta \leq 2^{(n+1)}/^2+1 \text{ for } n \text{ odd} \quad \text{Eq. 4}$$

$$\theta \leq 2^{(n+2)}/^2+1 \text{ for } n \text{ for } n \text{ even}$$

where the correlation function θ is defined in Eq. 5:

$$\theta(t) = \sum_{i=0}^{2^n-1} f(i)f(i+t) \quad \text{Eq. 5}$$

where t=time index;

i=sequence bit index; and f=sequence being correlated.

The apparatus 70 described above with reference to FIGS. 1 to 8 may, for example, employ a signature code of 508 bits length incorporating four concatenated Gold codes each of 127 bits length. By appropriate choice of the Gold codes, 264 225 024 different unique signature codes are thereby possible. Thus, by applying a Gold code limitation to the codes rather than a pseudo-random limitation thereto, the number of unique signature codes incorporating concatenated Gold codes is increased compared to signature codes of similar length incorporating concatenated MLSCs.

In order to employ a signature code of 508 bits length incorporating four concatenated Gold codes each of 127 bits length, the apparatus 70 described above is modified as follows:

(i) radiation bearing the signature code is repeatedly emitted from the antenna 260 at intervals whose durations are temporally jittered. The intervals are jittered in time steps of 11.26 μsec so that intervals between emission of radiation are in a range of 11.26 μsec to 112.6 μsec as defined by Eq. 1;

i) the correlator unit 280 incorporates only four 127 correlators 610a, 610b, 610c, 610d because the correlators 610e, 610f are not required;

ii) the AND gate 630 incorporates only four inputs, each input connected to its associated correlator 610a, 610b, 610c, 610d; and v) the signature code illustrated in FIG. 7 comprises only four codes M1, M2, M3, M4 and the codes M5, M6 are omitted; M1, M2, M3, M4 become Gold codes.

When Gold codes are employed in the apparatus 70, Table 3 provides an overview of the number of unique individual signature codes which are derivable:

TABLE 3

| $N_{stage}$ | $C_{length}$ (bits) | $N_{combin}$ | $N_{concat}$ | $N_{signat}$ | $T_{combin}$ (μsec) |
|---|---|---|---|---|---|
| 5 | 31 | 33 | 5 | 28480320 | 1.55 |
| 6 | 63 | 65 | 4 | 16248960 | 2.52 |
| 7 | 127 | 129 | 4 | 264225024 | 5.08 |
| 9 | 511 | 513 | 3 | 134217216 | 15.33 |
| 13 | 8191 | 8193 | 2 | 67177056 | 163.8 |
| 5 | 32767 | 32769 | 2 | 1073774592 | 655.3 |

In Table 3, $C_{length}$ and $N_{combin}$ are calculable from Eq. 2 and Eq. 6 respectively.

$$N_{combin}=[C_{length} \times 2] \quad \text{Eq. 6}$$

Generating signature codes by concatenating Gold code sequences provides more unique signature code combinations than employing signature codes each incorporating only a single unconcatenated Gold code sequence. This is an important advantage when signature codes incorporating concatenated Gold codes are used for uniquely identifying millions of road vehicles. To illustrate this advantage, Table 4 provides a comparison of code combination length and number of corresponding unique codes for concatenated and unconcatenated Gold code sequences.

TABLE 4

| n | [A] Signature code length (bits) $2^n - 1$ | [B] Number of combinations (uncontenated) $C_{length} + 2$ | [C] Number of combinations (2 concatenated sequences) | [D] Number of combinations (3 concatenated sequences) |
|---|---|---|---|---|
| 5 | 31 (m) | 33 (n) | 1056 (o) | 32736 (p) |
| 6 | 63 | 65 | 4160 | 262 080 |
| 7 | 127 | 129 (q) | 16512 | 1 097 024 |
| 9 | 511 | 513 | 262 656 | 134 217 216 |

In Table 4, column [A] corresponds to signature code length in bits, and column [B] corresponds to the number of unique signature codes which can be generated. For example, a signature code incorporating a single Gold code of 31 bits length (m) has 33(n) unique combinations.

If two Gold sequences of 31 bits length (m) are concatenated together to provide a signature code of 62 bits length then 1056 (o) unique combinations are possible, namely (n) 33×(33-1)=1056 (o), since two identical Gold code sequences concatenated together is not allowable for signature code generation. In comparison to this, a single Gold code of 63 bits length can only have 65 unique codes as shown Table 4. Concatenation of Gold codes thereby provides more unique combinations to a signature code incorporating them than including just a single Gold code into the signature code.

If three Gold code sequences of 31 bits length (m) are concatenated together to provide a signature code of 93 bits length (p), then 32 736 unique signature code combinations are possible. This number of combinations is considerably greater than provided in a signature code incorporating only a single unconcatenated Gold code of 127 bits which provides only 129 (q) unique combinations.

Although use of MLSCs and Gold codes to generate signature codes is described above, other types of code may also be employed in the apparatus 70. For example Bent-Function sequences as described by JD Olsen et al. in IEEE Transactions on Information Theory, Vol IT 28, no. 6 November 1982 pp. 858–864.

What is claimed is:

1. A proximity measuring apparatus incorporating:

(a) transponding means for receiving interrogating radiation and emitting return radiation in response thereto;

(b) interrogating means for generating and emitting the interrogating radiation and for receiving the return radiation for determining proximity of the interrogating means relative to the transponding means;

(c) the interrogating means is adapted to encode the interrogating radiation with a signature code comprising a plurality of concatenated data sequences; and (d) the transponding means is adapted to receive the interrogating radiation, and to encode the return radiation with the signature code, thereby enabling the interrogating means to associate the interrogating radiation with the return radiation.

2. An apparatus according to claim 1 wherein the concatenated data sequences incorporate concatenated pseudo-random data sequences.

3. An apparatus according to claim 1 wherein the concatenated data sequences incorporate concatenated Gold code data sequences.

4. An apparatus according to claim 1, wherein the interrogating means incorporates correlating means for correlating the signature code encoded into the interrogating radiation with a signature code encoded into return radiation received thereat, thereby enabling it to associate the interrogating radiation with its corresponding return radiation.

5. An apparatus according to claim 1, wherein the transponding means is adapted to emit the return radiation at a frequency which is substantially different to that of the interrogating radiation received thereat, thereby enabling the interrogating means to discriminate between passive reflections of the interrogating radiation and the return radiation.

6. An apparatus according to claim 1, wherein:
   (i) the transponding means (9) is arranged to emit the return signal as the return radiation after a time delay period from receipt of the interrogating radiation, said time delay period being greater than a time required for the interrogating radiation to propagate from the interrogating means to be passively reflected and re-received at more than a preset threshold intensity thereat; and
   (ii) the interrogating means is adapted to discriminate between reception of delayed and un-delayed return radiation.

7. A proximity measuring apparatus incorporating:
   (a) transponding means for receiving interrogating radiation and emitting return radiation in response thereto;
   (b) interrogating means for generating and emitting the interrogating radiation and for receiving the return radiation for determining proximity of the interrogating means relative to the transponding means;
   (c) the interrogating means is adapted to encode the interrogating radiation with a signature code comprising a plurality of concatenated data sequences;
   (d) the transponding means is adapted to receive the interrogating radiation, and to encode the return radiation with the signature code,
      thereby enabling the interrogating means to associate the interrogating radiation with the return radiation, wherein the interrogating means incorporates:
      (i) an antenna for emitting the interrogating radiation and receiving the return radiation, said antenna having a directional gain response comprising a direction of enhanced gain relative thereto;
      (ii) scanning means for angularly scanning said antennae; and
      (iii) computing means for controlling the scanning means and determining direction of the transponding means relative to the interrogating means from scan direction of said antenna in which the return radiation is received.

8. An apparatus according to claim 1, wherein the interrogating means incorporates computing means for determining a distance of the transponding means relative thereto, said computing means adapted to record an interval of time between emission of the interrogating radiation from said interrogating means and receipt of corresponding return radiation thereat, said computing means adapted to calculate said distance using said interval of time.

9. An apparatus according to claim 8, wherein the apparatus incorporates warning means in communication with the computing means, said computing means adapted to monitor position of the transponding means relative thereto, and to activate said warning means to provide a warning alarm when there is a risk of collision of said transponding means with said interrogating means.

10. An apparatus according to claim 8, wherein the computing means is adapted to monitor position of the transponding means relative to the interrogating means and activate braking means to modify a trajectory of said interrogating means for collision avoidance when there is a risk of collision of said transponding means with said interrogating means.

11. An apparatus according to claim 1, wherein the interrogating means is adapted to vary its time interval duration between successive emissions of interrogating radiation therefrom.

12. An apparatus according to claim 11, wherein the interrogating means is arranged to vary the time intervals in multiples of a time step, said multiples altering pseudo-randomly.

13. An apparatus according to claim 1, wherein the transponding means incorporates sensing means for sensing at least one of acceleration, speed and orientation of said transponding means, for providing data thereto, and the transponding means is adapted to encode said data onto the return radiation ($R_{out}$).

14. A vehicle incorporating the apparatus according to claim 1, wherein said vehicle incorporates said interrogating means in a frontal region thereof and said transponding means in a rear region thereof.

15. An elongate vehicle incorporating the apparatus according to claim 1, wherein said vehicle incorporates said interrogating means in a frontal region thereof and said transponding means in a rear region and side regions thereof, said side regions spatially situated substantially between said frontal region and said rear region.

16. A method of measuring proximity in a proximity measuring apparatus, the apparatus including an interrogator and a transponder, the method comprising the steps of:
   (a) generating and emitting interrogating radiation from the interrogator, said radiation incorporating a signature code comprising a plurality of concatenated data sequences;
   (b) receiving the interrogating radiation at the transponder and generating a receive signal in response thereto;
   (c) storing the receive signal;
   (d) generating a return signal in response to the receive signal, said return signal encoded with the signature code;
   (e) emitting the return signal after a time delay period from receipt of the interrogating radiation;
   (f) receiving the return radiation at the interrogator;
   (g) correlating the signature code encoded into the interrogating radiation with the signature code encoded into the return radiation for associating the return radiation with the interrogating radiation; and
   (h) calculating at the interrogator proximity of the transponder relative thereto from propagation direction of the return radiation relative to the interrogator and time interval between emission of the interrogating radiation and receipt of the return radiation.

17. A method according to claim 16, wherein the concatenated data sequences incorporate concatenated pseudo-random data sequences.

18. A method according to claim 16, wherein the concatenated data sequences incorporate concatenated Gold code data sequences.

* * * * *